(12) United States Patent
Hong et al.

(10) Patent No.: US 10,536,868 B2
(45) Date of Patent: Jan. 14, 2020

(54) METHOD AND APPARATUS FOR PERFORMING MEASUREMENT IN WIRELESS COMMUNICATION SYSTEM

(71) Applicant: Samsung Electronics Co., Ltd., Suwon-si, Gyeonggi-do (KR)

(72) Inventors: Jin-Kyu Hong, Seongnam-si (KR); Se-Jin Kim, Seoul (KR); Jae-Ho Song, Suwon-si (KR); Byung-Wook Kim, Suwon-si (KR); Myung-Hoon Yeon, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 132 days.

(21) Appl. No.: 15/409,790

(22) Filed: Jan. 19, 2017

(65) Prior Publication Data

US 2017/0251389 A1 Aug. 31, 2017

(30) Foreign Application Priority Data

Feb. 29, 2016 (KR) .................. 10-2016-0024575
Mar. 30, 2016 (KR) .................. 10-2016-0038313

(51) Int. Cl.
*H04W 24/08* (2009.01)
*H04B 17/318* (2015.01)
*H04W 24/10* (2009.01)

(52) U.S. Cl.
CPC .......... *H04W 24/08* (2013.01); *H04B 17/318* (2015.01); *H04W 24/10* (2013.01)

(58) Field of Classification Search
CPC ... H04W 24/08; H04W 76/048; H04W 24/10; H04B 17/318
See application file for complete search history.

(56) References Cited

U.S. PATENT DOCUMENTS

| | | | |
|---|---|---|---|
| 2007/0275666 A1* | 11/2007 | Lee ...................... | H04B 1/1027 455/67.13 |
| 2013/0077514 A1* | 3/2013 | Dinan .................. | H04L 5/0057 370/252 |
| 2013/0176873 A1 | 7/2013 | Ji et al. | |
| 2015/0282076 A1* | 10/2015 | Larmo .............. | H04W 52/0209 370/311 |
| 2018/0063765 A1* | 3/2018 | Bansal .................. | H04W 24/02 |

* cited by examiner

*Primary Examiner* — Yemane Mesfin
*Assistant Examiner* — Henry Baron
(74) *Attorney, Agent, or Firm* — Harness, Dickey & Pierce, P.L.C.

(57) ABSTRACT

A measurement method by a user equipment (UE) including receiving a first measurement list from a base station, the first measurement list including one or more measurement candidates, and measuring signal quality of at least some of the one or more measurement candidates independent of corresponding one or more measurement periods, the one or more measurement periods being periods determined for the at least some of the one or more measurement candidates may be provided.

17 Claims, 10 Drawing Sheets

METHOD AND APPARATUS FOR PERFORMING MEASUREMENT IN WIRELESS COMMUNICATION SYSTEM

CROSS-REFERENCE TO RELATED APPLICATION(S)

This application claims priority under 35 U.S.C. § 119(a) of a Korean patent application filed in the Korean Intellectual Property Office on Feb. 29, 2016 and assigned Serial No. 10-2016-0024575, and a Korean patent application filed in the Korean Intellectual Property Office on Mar. 30, 2016 and assigned Serial No. 10-2016-0038313, the entire contents of each of which are incorporated herein by reference.

BACKGROUND

The present disclosure relates to apparatuses and/or methods for performing measurement in wireless communication systems.

Usage of terminals communicating with other devices through wireless signals (e.g., laptop computers, personal digital assistants (PDAs), mobile or cellular phones, or others) are more and more increasing. Terminals typically utilize various channels for different operation modes, respectively. Preservation of network resources, such as bandwidth, is becoming more important owing to usage of power-consuming applications, which are running on such terminals while being required to remain connected with a network. Terminals may be equipped with finite power sources (e.g., rechargeable batteries). Such finite power sources are required to operate terminals in various modes for a prolonged period of time.

A terminal may operate in one of diverse operation modes including a "connected mode" and an "idle mode." The terminal in the connected mode may vigorously communicate data (e.g., voice or data calls or sessions) with one or more access nodes in a wireless communication system. A client terminal in the idle mode may monitor the paging channel (PCH) for paging messages or other control channels. Such paging messages may include messages for alerting the client terminal as to occurrence of an incoming voice or data call and/or control/overhead messages for transferring system information and other information about the client terminal.

The idle mode of a terminal may consume less power than the connected mode does. However, a terminal in the idle mode still consumes power for monitoring the paging channel. In order to reduce power consumption in the idle mode, paging messages may be transmitted to the client terminal through the paging channel at designated times. The client terminal may operate in a discontinuous reception (DRX) mode to monitor the paging channel periodically, not continuously, thereby decreasing power consumption. In the DRX mode, the terminal wakes up from a "sleep" state and enters an "awake" state to process the paging channel for messages, and unless additional communication is required, the terminal may enter back into the sleep state. One period during which the terminal repeats the "sleep" state and "awake" state may be termed a "DRX cycle."

The terminal may perform measurement on frequencies in the idle mode. The measurement may include measurement on a downlink carrier frequency (intra-frequency) of a serving cell, measurement on a frequency (inter-frequency) different from the downlink carrier frequency, and measurement on a frequency (inter-RAT frequency) of a radio access technology (RAT) different from a RAT of the serving cell. Measurements of reference signal received power (RSRP) and/or reference signal received quality (RSRQ) may be taken for target frequencies. The terminal may carry out cell reselection based on a result of measurements for the frequencies in the idle mode.

SUMMARY

According to an example embodiment of the present disclosure, a measurement method by a user equipment (UE) may include receiving a first measurement list from a base station, the first measurement list including one or more measurement candidates, and measuring signal quality of at least some of the one or more measurement candidates independent of corresponding one or more first measurement periods, the one or more first measurement periods being periods determined for the at least some of the one or more measurement candidates.

According to an example embodiment of the present disclosure, a user equipment (UE) may include a transceive, and a processor coupled with the transceiver, the processor configured to receive a first measurement list from a base station, the first measurement list including one or more measurement candidates, and measure signal quality of at least some of the one or more measurement candidate independent of corresponding one or more first measurement periods, the one or more first measurement periods being periods determined for the at least some of the one or more measurement candidates.

According to an example embodiment of the present disclosure, a chip for wireless communication may include a transceiver and a processor coupled with the transceiver, the processor configured to receive a measurement list from a base station, the measurement list including one or more measurement candidates, and measure signal quality of at least some of the one or more measurement candidates independent of corresponding one or more measurement periods, the one or more measurement periods being periods determined for the at least some of the one or more measurement candidates.

BRIEF DESCRIPTION OF THE DRAWINGS

A more complete appreciation of the present disclosure and many of the attendant aspects thereof will be more clearly understood by referring to the following detailed description taken in conjunction with the accompanying drawings, wherein.

Throughout the drawings, like reference numerals will be understood to refer to like parts, components, or structures.

DETAILED DESCRIPTION

Advantages and features of the present disclosure may be understood through the example embodiments to be described below taken in conjunction with the accompanying drawings. However, the present disclosure is not limited to the example embodiments disclosed herein, and various changes may be made thereto. The example embodiments disclosed herein are provided only to inform one of ordinary skilled in the art of the category of the present disclosure. The present disclosure is defined only by the appended claims.

Although the terms "first" and "second" are used to describe various components, the components are not limited by the terms. These terms are provided simply to distinguish one component from another. Accordingly, the first component mentioned herein may be a same sort of component as the second component within the technical spirit of the present disclosure.

Figure 1:
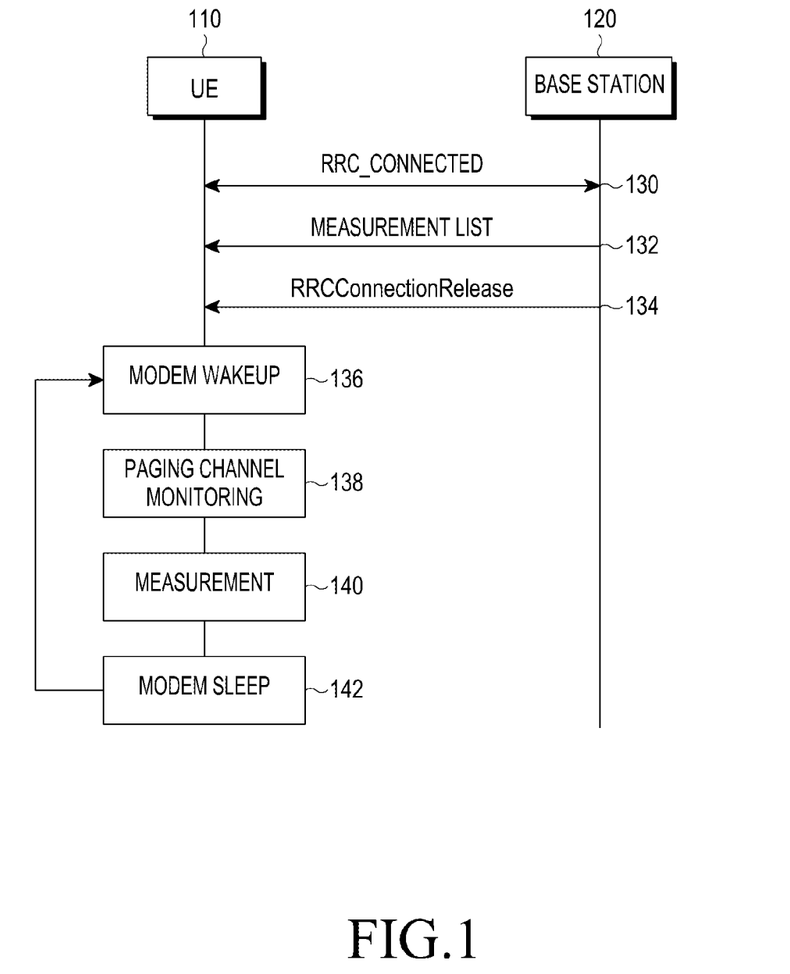
FIG. 1 is a flowchart illustrating operations of a user equipment and a base station according to an example embodiment of the present disclosure.

FIG. 1 is a flowchart illustrating operations of a user equipment and a base station according to an example embodiment of the present disclosure. Referring to FIG. 1, a user equipment (UE) 110 may remain radio resource control (RRC) connected with a base station 120 (130). The RRC connected state may also be denoted as one of a "connection mode," an "RRC_CONNECTED mode," or an "active mode." The UE 110 may be connected with the base station 120 via, for example, long term evolution (LTE), but not limited thereto.

The UE 110 may receive a measurement list for measurement in an idle mode from the base station 120 (132). Although FIG. 1 illustrates that the measurement list is received in the connection mode, receiving the measurement list is not so limited. In some example embodiments, the measurement list may be received in the idle mode. The measurement list may be transmitted through RRC signaling from the base station 120. The measurement list may be transmitted through, for example, system information block (SIB) (not shown). According to an example embodiment, the measurement list may be received through an RRCConnectionReconfiguration message (not shown). The measurement list received through the RRCConnectionReconfiguration message may be used for measurement in the connection mode. The measurement list received through the RRCConnectionReconfiguration message may be used for measurement in the idle mode.

The measurement list may include candidates for measurement in the UE 100, and the candidates may include at least one candidate frequency. The at least one candidate frequency may include a downlink carrier frequency(ies) of a serving cell (e.g., the base station 120), a frequency(ies) (inter-frequency) different from the serving cell's downlink carrier frequency(ies), and a frequency(ies) (inter-RAT frequency) of at least one radio access technology (RAT) different from that of the serving cell. For example, when the base station 120 serves the UE 110 through evolved universal terrestrial access (E-UTRA) (e.g., LTE), the frequency of the at least one RAT different from that of the serving cell may include, for example, at least one of UTRA frequencies, GSM EDGE radio access network (GERAN) frequencies, code division multiple access (CDMA) 2000 high rate packet data (HRPD) frequencies, or CDMA 2000 1×RTT frequencies. However, example embodiments are not limited thereto.

The UE 110 may receive an RRCConnectionRelease message from the base station 120 (134). When the UE 110 receives the RRCConnectionRelease message from the base station 120, the RRC connection between the UE 110 and the base station is released, and the UE 110 may enter a RRC_IDLE mode (not shown). The RRC_IDLE mode may also be denoted as an idle mode.

The UE 110 may repeatedly perform operations such as modem wakeup operation 136, paging channel monitoring operation 138, measurement operation 140, and/or modem sleep operation 142, in the idle mode. In the modem wakeup operation 136, the UE 110 may wake up a modem in a sleep state to monitor a paging channel. In the paging channel monitoring operation 138, the UE 110 may receive a paging message while monitoring the paging channel. In the measurement operation 140, the UE 110 may perform measurement on at least one candidate frequency in the measurement list. The measurement may include measurement of the RSRP or RSRQ of at least one candidate frequency. In the modem sleep operation 142, the UE 110 may save power by stopping the modem from operation. After the modem sleep operation 142, the UE 110 may perform the modem wakeup operation 136 to receive a paging signal from the base station at a desired (or alternatively, predetermined) time. One period of the modem wakeup operation 136, paging channel monitoring operation 138, measurement operation 140, and modem sleep operation 142 may be denoted a DRX cycle.

At the first DRX cycle after entering the idle mode, the UE 110 may measure signal quality while ignoring the measurement period and/or order determined for all or at least some of the measurement candidates in the measurement list during the measurement operation 140. In some example embodiments, the measurement of signal quality for at least some of the measurement candidates may be carried out sequentially independent of the determined measurement period. The duration of the modem sleep operation 142 may be varied depending on the time of termination of the signal quality measurement for all or at least some of the measurement candidates in the measurement list. For example, when the time of termination of signal quality measurement is delayed, the duration of the modem sleep operation 142 may be decreased. The modem sleep operation 142 may be omitted upon failing to measure signal quality for all or at least some of the measurement candidates in the measurement list at the first DRX cycle after entering the idle mode or when the remaining time of the DRX cycle (e.g., time remaining to the modem wakeup operation 136) after performing the measurement of signal quality is less than a threshold.

As the UE 110 attempts measurement of signal quality while ignoring the measurement period and/or order determined for all (or at least some) of the measurement candidates in the measurement list at the first DRX cycle after entering the idle mode, the UE 110 may conduct measurement on all (or at least some) of the measurement candidates more quickly than it does according to a desired (or alternatively, predetermined) period and order for the measurement candidates. Hence, the UE 110 may prevent or reduce various issues such as reselection to a lower-priority cell issue, additional reselection or handover to a higher-priority cell issue, or out-of-sync issue that may arise when the measurement is not performed on all of the measurement candidates, and thus cell reselection needs to be performed.

The UE 110 may measure signal quality for all or at least some of measurement candidates in the measurement list in the connection mode. According to an example embodiment of the present disclosure, signal quality may be measured sequentially and independent of the measurement period and/or order determined for all or at least some of the measurement candidates updated in the measurement list. For example, when the measurement list has been updated while the UE 110 is in the connection mode, the UE 110 may measure signal quality sequentially and independent of the measurement period and/or order determined for all or at least some of the updated measurement candidates.

Figure 2:
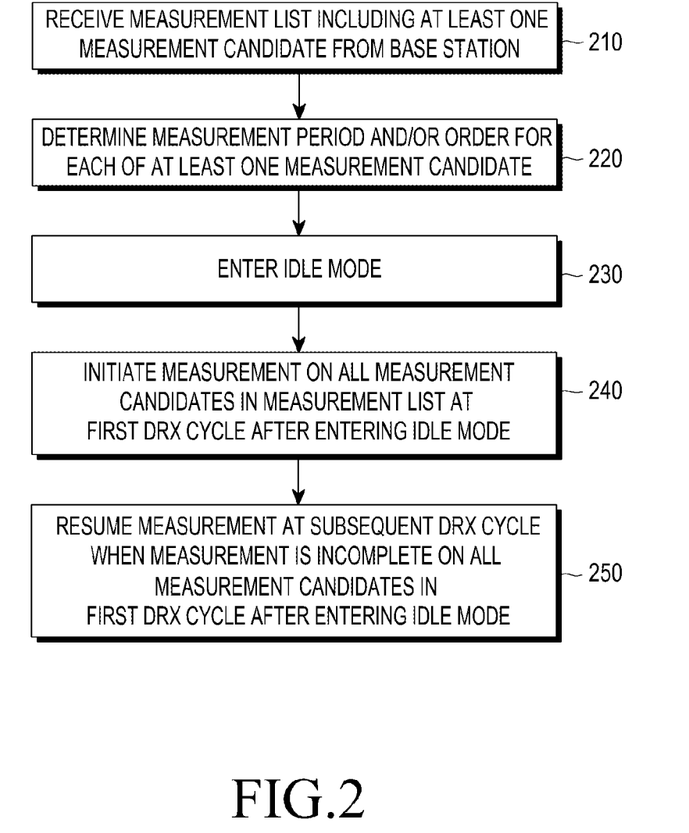
FIG. 2 is a flowchart illustrating operations of a user equipment according to an example embodiment of the present disclosure.

Operations of the UE 110 are now described in greater detail with reference to FIG. 2. FIG. 2 is a flowchart illustrating operations of a user equipment according to an example embodiment of the present disclosure.

The UE 110 may receive a measurement list including at least one measurement candidate from a base station 120 (210). The UE 110 may determine a measurement period and/or order for each of the at least one measurement candidate (220). Although FIG. 2 illustrates that the measurement period for each of the at least one measurement candidate is determined before entering an idle mode, the measurement period for each of the at least one measurement candidate may be determined during or after entering the idle mode according to some example embodiments of the present disclosure. The UE 110 may enter the idle mode (230). The UE 110 may initiate measurement on all of the measurement candidates in the measurement list at a first DRX cycle after entering the idle mode (240). The measurement may include measurement of signal quality, for example, measurement of a RSRP or RSRQ. The UE 110 may operate independent of the measurement period and/or order determined for each of at least one measurement candidate in order to initiate the measurement on all of the measurement candidates in the measurement list at the first DRX cycle after entering the idle mode. According to some example embodiments of the present disclosure, the UE 110 may perform measurement independent of the measurement period and/or order for determined at least some of the measurement candidates in the measurement list at the first DRX cycle after entering the idle mode. At least some of the measurement candidates may be selected based on, for example, the choice by the UE 110 and/or the likelihood of cell reselection or handover.

Figure 3:
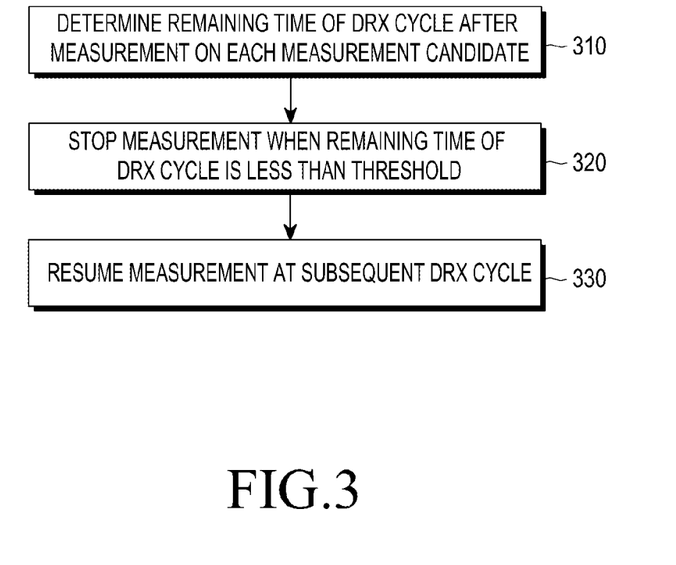
FIG. 3 is a flowchart illustrating operations of a user equipment when measurement has not been done on all target candidates in a measurement list at a first DRX cycle after entering an idle mode according to an example embodiment of the present disclosure.

When the measurement of all (or at least some) of the measurement candidates in the measurement list at the first DRX cycle after entering the idle mode is incomplete, the UE 110 may resume measurement at a subsequent DRX cycle (250), as described in more detail with reference to FIG. 3. FIG. 3 is a flowchart illustrating operations of a user equipment when measurement has not been completed on all target candidates in a measurement list at a first DRX cycle after entering an idle mode according to an example embodiment of the present disclosure. The flowchart of FIG. 3 may be applicable to cases where measurement is performed independent of the measurement period and/or order determined for at least some of the measurement candidates.

The UE 110 may determine the remaining time of the DRX cycle after measurement on each of the measurement candidates (310). When the determined remaining time of the DRX cycle is less than a threshold (e.g., when the remaining time is insufficient to perform the remaining measurement), the UE 110 may stop the measurement (320). The UE 110 may resume the stopped measurement at a subsequent DRX cycle (330). When the measurement has not been completed at the first DRX cycle after entering the idle mode, the remaining measurement may be performed at a second DRX cycle. When the measurement still has not been completed at the second DRX cycle, the remaining measurement may be done at a third DRX cycle. In such a way, measurement may be performed at subsequent DRX cycles until the measurement is completed on all of the measurement candidates. When measurement is completed on all the measurement candidates at a DRX cycle, the UE 110 may perform measurement as per the period and order determined for each of the measurement candidates at a subsequent DRX cycle.

Figure 4:
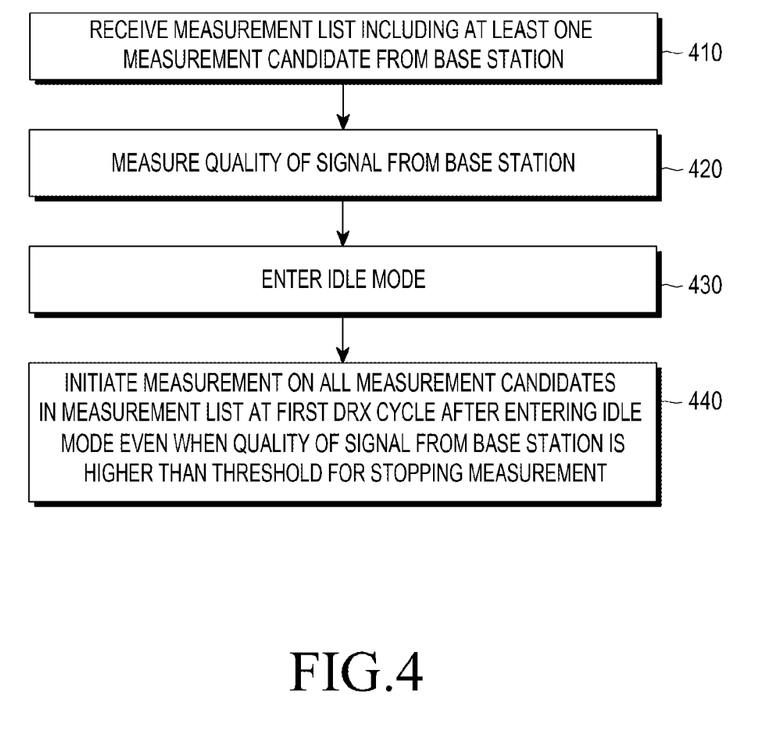
FIG. 4 is a flowchart illustrating operations of a user equipment according to an example embodiment of the present disclosure.

Another example embodiment of the present disclosure is described below with reference to FIG. 4. FIG. 4 is a flowchart illustrating operations of a user equipment according to an example embodiment of the present disclosure.

Referring to FIG. 4, the UE 110 may receive a measurement list including at least one measurement candidate from a base station (410). The UE 110 may measure the quality of a signal from the base station 120 (420). The measurement of the quality of the signal from the base station 120 may include measurement of a RSRP or RSRQ. The base station 120 may be a serving base station for the UE 110. When the quality of the signal from the base station is higher than a threshold (e.g., $S_{nonintrasearch}$ parameter), the UE 110 may be configured to not perform measurement on the measurement candidates in order to save power. The UE may enter an idle mode (430). If the UE 110 does not perform measurement on the measurement candidates because the quality of signal from the base station 120 is higher than the threshold for stopping measurement, and when communication with the base station 120 substantially deteriorates, cell reselection may be delayed by the time required for measuring the measurement candidates or the UE 110 may turn into an out-of-sync state.

Even when the quality of the signal from the base station 120 is higher than the threshold for stopping measurement, the UE 110 may initiate measurement on all (or at least some) of the measurement candidates in the measurement list at the first DRX cycle after entering the idle mode while operating independent of the determined measurement period and/or order (440). According to this example embodiment of the present disclosure, the UE 110 may initiate measurement on all of the measurement candidates in the measurement list at the first DRX cycle after entering the idle mode even when the quality of signal from the base station 120 is higher than the threshold for stopping measurement, thus allow relatively quick cell reselection to a higher-priority cell even when the communication with the serving base station 120 substantially worsens. When measurement on all the measurement candidates has been completed at a DRX cycle, and the quality of signal from the base station 120 is higher than the threshold for stopping measurement, the UE 110 may not perform measurement on the measurement candidates at its subsequent DRX cycles.

Figure 5:
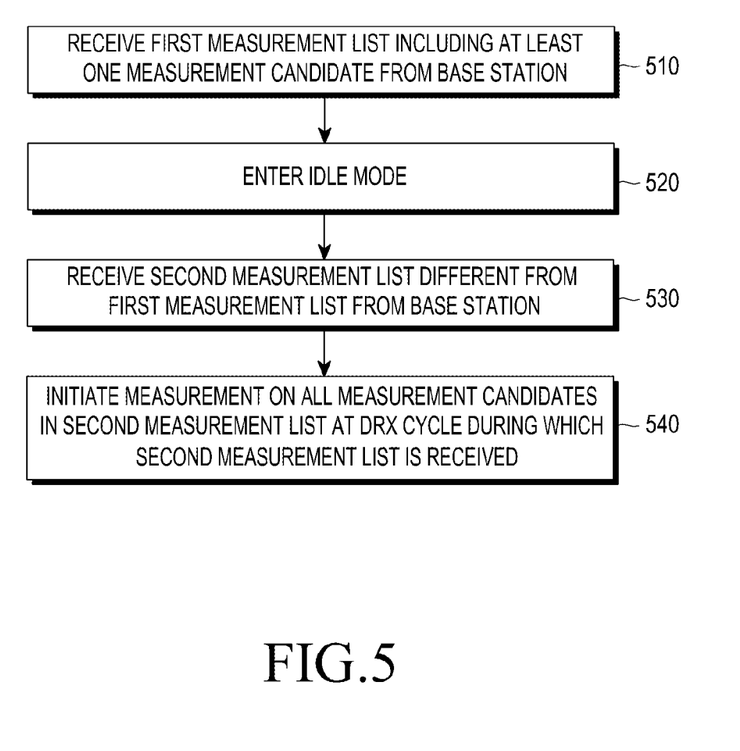
FIG. 5 is a flowchart illustrating operations of a user equipment according to an example embodiment of the present disclosure.

Another example embodiment of the present disclosure is described below with reference to FIG. 5. FIG. 5 is a flowchart illustrating operations of a user equipment according to an example embodiment of the present disclosure.

The UE 110 may receive a first measurement list including at least one measurement candidate from a base station 120 (510). The UE 110 may enter an idle mode (520). Although not shown in FIG. 5, the UE 110 may initiate measurement on all of the measurement candidates in the first measurement list at a first DRX cycle after entering the idle mode. The UE 110 may receive a second measurement list different from the first measurement list from the base station 120 (530). At least one of the measurement candidates in the second measurement list may differ from one of the measurement candidates in the first measurement list. The second measurement list may be received through a paging signal. The UE 110 may initiate measurement on all (or at least some) of the measurement candidates in the second measurement list at the DRX cycle during which the second measurement list is received, independent of the determined measurement period and/or order (540). Hence, when the measurement candidates are varied, the UE 110 may rapidly obtain measurements for the varied measurement candidates, prepare itself for a rapid cell reselection. If measurement has not been completed on all of the measurement candidates in the second measurement list at the DRX cycle during which the second measurement list is received, the UE 110 may resume the measurement at a subsequent DRX cycle. When the UE 110 initiates measurement on at least some of the measurement candidates in the second measurement list at the DRX cycle during which the second measurement list is received, measurement candidates different from measurement candidates in the first measurement list may be chosen for measurement.

Figure 6:
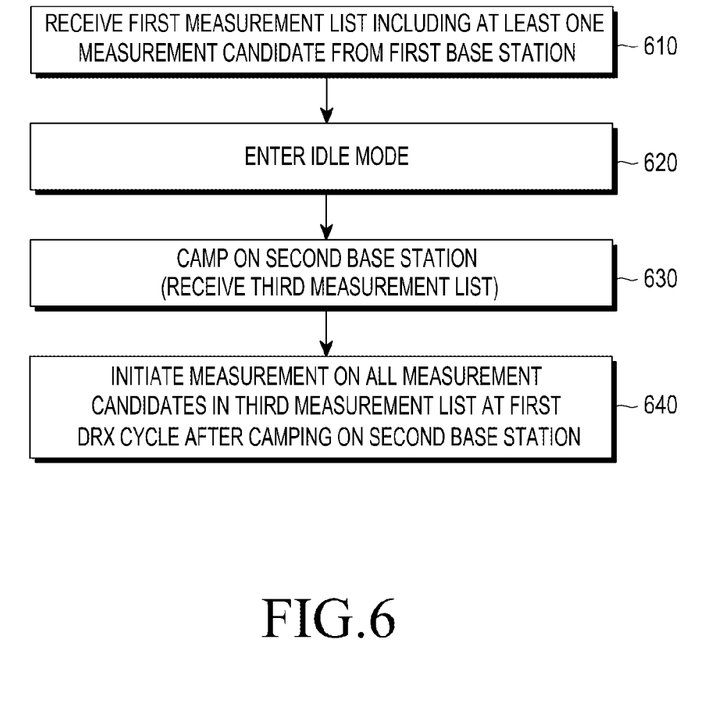
FIG. 6 is a flowchart illustrating operations of a user equipment according to an example embodiment of the present disclosure.

Another example embodiment of the present disclosure is described below with reference to FIG. 6. FIG. 6 is a flowchart illustrating operations of a user equipment according to an example embodiment of the present disclosure.

Referring to FIG. 6, the UE 110 may receive a first measurement list including at least one measurement candidate from a first base station (610). The first base station may be the same as or similar to the base station 120 shown in FIG. 1. The UE 110 may enter an idle mode (620). Although not shown in FIG. 6, the UE 110 may initiate measurement on all (or at least some) of the measurement candidates in the first measurement list at the first DRX cycle after entering the idle mode, while disregarding the determined measurement period and/or order. The UE 110 may camp on the second base station in the idle mode (630). The UE 110 may camp on the second base station through, for example, cell reselection to the second base station. The UE 110 may receive a third measurement list from the second base station while camping on the second base station. The UE 110 may initiate measurement on all of the measurement candidates in the third measurement list at the first DRX cycle after camping on the second base station (640). By initiating measurement on all (or at least some) of the measurement candidates in the third measurement list at the first DRX cycle after camping on the second base station, the UE 110 may relatively quickly complete measurement on all the measurement candidates after the change of measurement list due to the cell reselection, effectively preparing itself for a rapid additional cell reselection. When the UE 110 initiates measurement on at least some of the measurement candidates in the third measurement list at the first DRX cycle after camping on the second base station, measurement candidates different from measurement candidates in the first measurement list may be chosen for measurement.

Figure 7:
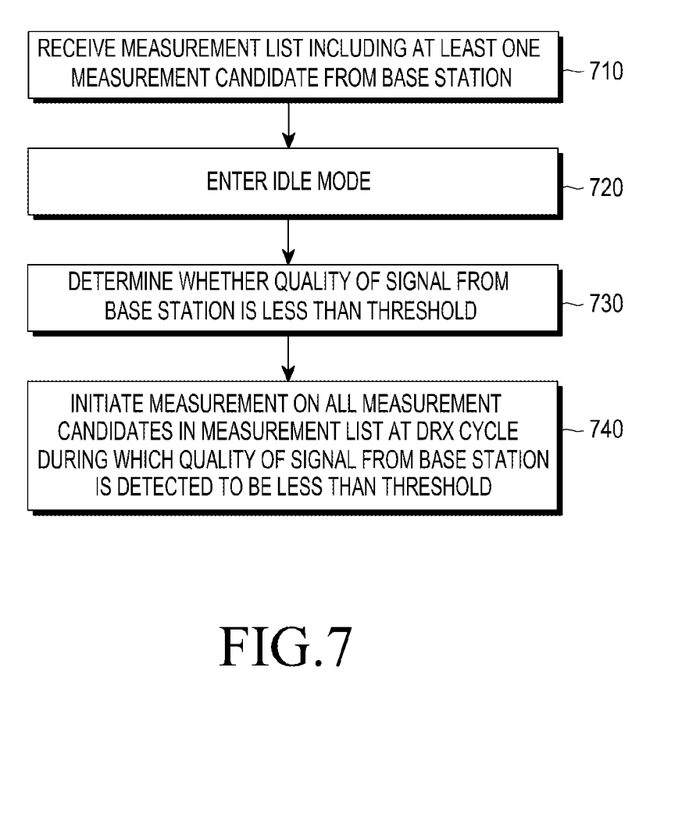
FIG. 7 is a flowchart illustrating operations of a user equipment according to an example embodiment of the present disclosure.

Another example embodiment of the present disclosure is described below with reference to FIG. 7. FIG. 7 is a flowchart illustrating operations of a user equipment according to an example embodiment of the present disclosure.

The UE 110 may receive a measurement list including at least one measurement candidate from a base station 120 (710). The UE 110 may enter an idle mode (720). Although not shown in FIG. 7, the UE 110 may initiate measurement on all (or at least some) of the measurement candidates in the measurement list at the first DRX cycle after entering the idle mode, while disregarding the determined measurement period and/or order. In the idle mode, the UE 110 may determine whether the quality of signal from the base station 120 is less than a threshold (730). The quality of signal from the base station 120, as compared with the threshold, may include a RSRP or RSRQ. The UE 110 may initiate measurement on all (or at least some) of the measurement candidates in the measurement list at the DRX cycle during which the quality of signal from the base station 120 is detected to be less than the threshold (740). When the quality of signal from the base station 120 is less than the threshold, cell reselection may be highly likely to occur. The UE 110 may initiate measurement on all (or at least some) of the measurement candidates in the measurement list at the DRX cycle during which the quality of signal from the base station 120 is detected to be less than the threshold to update the values measured for all the measurement candidates, thereby preparing itself for cell reselection.

According to an example embodiment of the present disclosure, the UE 110 may adjust the period of measurement for measurement candidates depending on the quality of signal from the base station 120. For example, the UE 110 may reduce the measurement period when the quality of signal from the base station 120 is not less than a threshold and may increase the measurement period when the signal quality is less than the threshold.

Figure 8:
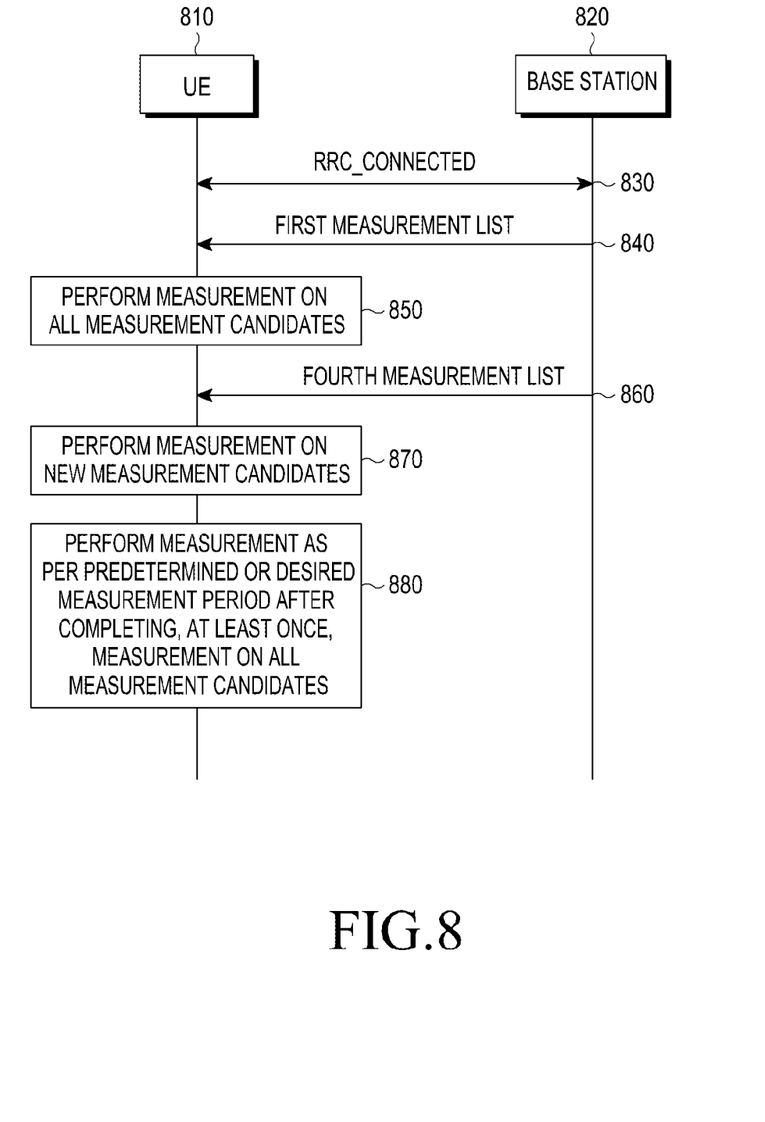
FIG. 8 is a flowchart illustrating operations of a user equipment and a base station according to an example embodiment of the present disclosure.

Another example embodiment of the present disclosure is described below with reference to FIG. 8. FIG. 8 is a flowchart illustrating operations of a user equipment and a base station according to an example embodiment of the present disclosure.

The UE 810 may be in a connection mode (e.g., RRC_CONNECTED mode) with a base station 820 (830). The UE 810 may receive a first measurement list including at least one measurement candidate from the base station 820 (840). The first measurement list may be transmitted through, for example, RRCConnectionReconfiguration message. The UE 810 may perform measurement on all of the measurement candidates included in the first measurement list in the connection mode while disregarding the determined measurement period and/or order (850). For example, when the UE 810, after turning on, receives the first measurement list as an initial measurement list, measurement may be carried out on all the measurement candidates. In the connection mode, the UE 810 may receive a fourth measurement list from the base station 820 (860). The fourth measurement list may be transmitted through, for example, RRCConnectionReconfiguration message. In the connection mode, the UE 810 may perform measurement on new measurement candidates (870). For example, the UE 810 may perform measurement on measurement candidates, which is included in the fourth measurement list, but not included in the first measurement list among the measurement candidates. When all the measurement candidates in the fourth measurement list differ from the measurement candidates in the first measurement list, measurement may be performed on all the measurement candidates in the fourth measurement list. The UE 810, after completing measurement on all the measurement candidates (in the fourth measurement list) at least once, may perform measurement on measurement candidates at a desired (or alternatively, predetermined) measurement period (880). As such, the UE 810 may obtain results of measurement on all the measurement candidates while reducing power consumption for measurement by performing measurement first on new measurement candidates only, but not all the measurement candidates, upon reception of the new measurement list.

Figure 9:
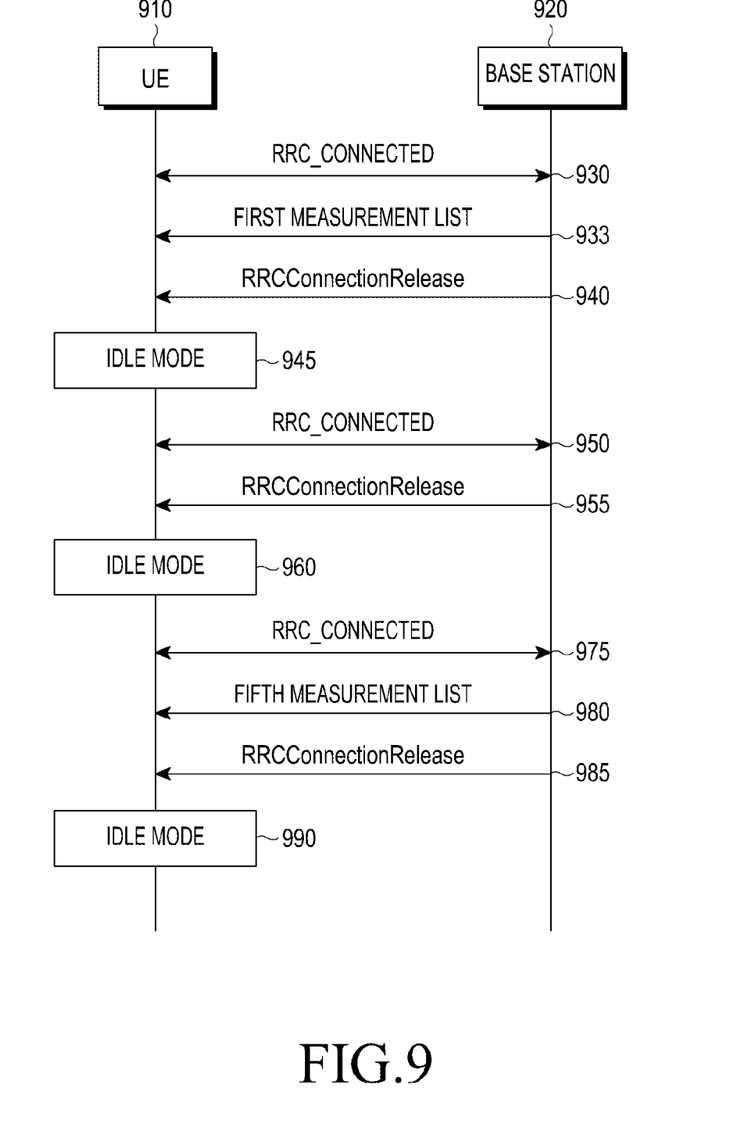
FIG. 9 is a flowchart illustrating operations of a user equipment and a base station according to an example embodiment of the present disclosure.

Another example embodiment of the present disclosure is described below with reference to FIGS. 9 and 10. FIG. 9 is a flowchart illustrating operations of a user equipment and a base station according to an example embodiment of the present disclosure.

Referring to FIG. 9, the UE 910 may be in a connection mode with a base station 920 (930). The UE 910 may receive a first measurement list from the base station 920 (935). After receiving the first measurement list from the base station 920, the UE 910 may receive an RRCConnectionRelease message (940) and thus may enter an idle mode 945. In the idle mode 945, the UE 910 may perform operations 240 and 250 of FIG. 2. After the idle mode 945, the UE 910 may be back into the connection mode with the base station 920 (950). The UE 910 may enter the idle mode 960 by receiving a RRCConnectionRelease message 955 from the base station 920 without receiving a measurement list different from the first measurement list from the base station 920 while in the connection mode. Because the UE 910 does not receive in the idle mode 960 any measurement list other than the first measurement list in which measurement has previously been completed for all the measurement candidates, the UE 910 may perform measurement according to a measurement period and/or order as determined in operation 220 of FIG. 2. After the idle mode 960, the UE 910 may be back in the connection mode with the base station 920 (975). The UE 910 may receive a fifth measurement list in the connection mode. The fifth measurement list may differ from the first measurement list. The fifth measurement list may be transmitted through, for example, a system information block (SIB) from the base station 920. The UE 910, after receiving the fifth measurement list, may receive an RRCConnectionRelease message from the base station 920 (985) to enter the idle mode (990). In the idle mode 990, when the fifth measurement list differs from the first measurement list, the UE 910 may perform measurement on all (or at least some) of the measurement candidates in the fifth measurement list independent of the determined measurement period and/or order. When the UE initiates measurement on at least some of the measurement candidates in the fifth measurement list, measurement candidates different from measurement candidates in the first measurement list may be chosen for measurement.

Measurement in the idle mode 990 may be the same as or substantially similar to the measurement described in connection with operations 240 and 250 of FIG. 2. Operations of the UE 910 are now described in further detail with reference to FIG. 10. FIG. 10 is a flowchart illustrating operations of a user equipment according to an example embodiment of the present disclosure.

Figure 10:
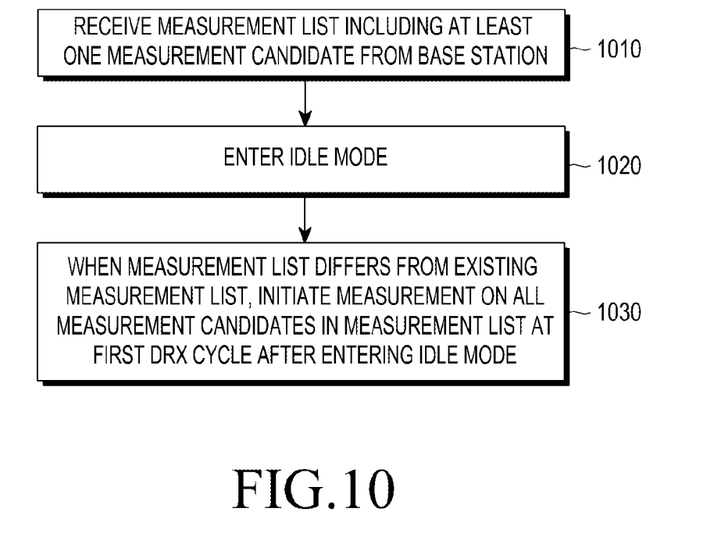
FIG. 10 is a flowchart illustrating operations of a user equipment according to an example embodiment of the present disclosure.

Referring to FIG. 10, the UE 910 may receive a measurement list including at least one measurement candidate from a base station 920 (1010). The UE 910 may enter an idle mode (1020). When the received measurement list differs from an existing measurement list, the UE 910 may initiate measurement on all (or at least some) of measurement candidates in the measurement list at the first DRX cycle after entering the idle mode while disregarding the determined measurement period and/or order (1030). When the UE 910 initiates measurement on at least some of the measurement candidates in the measurement list, measurement candidates different from measurement candidates in the existing measurement list may be chosen for measurement. When failing to receive a measurement list different from the existing measurement list or when the existing measurement list is the same as the received measurement list, the UE 910 may perform measurement on the measurement candidates as per the determined measurement period and/or order as described above in connection with operation 220 of FIG. 2. By performing measurement on all (or at least some) of the measurement candidates only in the idle mode after the measurement list is varied while disregarding the determined measurement period and/or order, the UE 910 may keep retaining the values measured for all the measurement candidates to prepare itself for a rapid cell reselection and reduce its power consumption.

Figure 11:
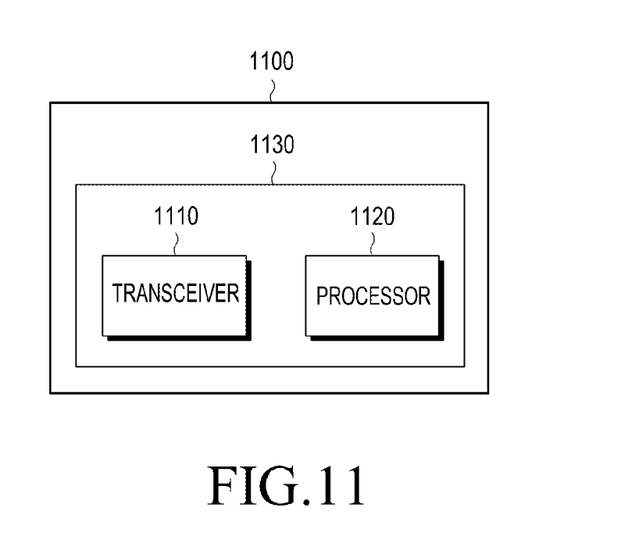
FIG. 11 is a block diagram illustrating a user equipment according to an example embodiment of the present disclosure.

A user equipment 1100 according to the present disclosure is described with reference to FIG. 11. FIG. 11 is a block diagram illustrating a user equipment according to an example embodiment of the present disclosure.

The UE 1100 of FIG. 11 may be configured to perform the operations of the UE described above in connection with FIGS. 1 to 10. The UE 1100 may include a transceiver 1110 and a processor 1120 electrically and communicably coupled with the transceiver 1110. The UE 1110 may transmit and receive signals through the transceiver 1110. The processor 1120 may be configured to control the operation of the UE 1110. The operations of the UE described above in connection with FIGS. 1 to 10 may be processed and run substantially by the processor 1120. Although transmission or reception of signals is performed through the transceiver 1110, the operations of the transceiver 1110 may be controlled by the processor 1120, and thus, transmission and reception of signals may also be regarded as being performed by the processor 1120. The UE 1130 may include a chip 1130 capable of performing functions of the transceiver 1110 and the processor 1120. The chip 1130 may be configured to perform operations for wireless communication of the UE described above in connection with FIGS. 1 to 10. Although the chip 1130 is illustrated as a single chip in FIG. 11, it is not limited thereto. For example, the term "chip" here may be an assembly in which a core functioning as the transceiver 1110 and a core functioning as the processor 1120 are physically combined together or an assembly of chips physically separated from each other depending on their functionality.

It may be further appreciated by one of ordinary skill in the art that various example logic blocks, modules, circuits, methods, and algorithms described in connection with the example embodiments described herein may be implemented in hardware, computer software, or a combination thereof. In order to clarify interchangeability between hardware and software, various example components, blocks, modules, circuits, methods, and algorithms have been generally described in light of their functionality. Whether such functionality is implemented in hardware or software relies on a particular application and design limitations given to the overall system. The disclosed functionality may be embodied in various manners on each particular application by one of ordinary skill in the art, but such determination should not be interpreted as causing departure from the category of the present disclosure.

Various example logic blocks, modules, and circuits described herein in the example embodiments the present disclosure may be implemented or performed by a general-purpose processor, digital signal processor (DSP), application specific integrated circuit (ASIC), field programmable gate array (FPGA) or other programmable logic device, discrete gate or transistor logic, discrete hardware components, or their combinations designed to carry out the functions disclosed herein. The general-purpose processor may be a microprocessor. Alternatively, the processor may be a common processor, controller, microcontroller, or state machine. Further, the processor may be implemented in a combination of computing devices, for example, a combination of a DSP and a microprocessor, multiple microprocessors, one or more microprocessors integrated with a DSP core, or any other configurations.

The methods and algorithms described in connection with the example embodiments described herein may be directly implemented in hardware, a software module run by the processor, or in a combination thereof. The software module may reside in a random access memory (RAM), flash memory, read only memory (ROM), erasable programmable ROM (EPROM), electrically erasable programmable ROM (EEPROM), registers, hard disk, removable disk, compact disc ROM (CD-ROM) or any other type of storage medium known in the art. The storage medium may be combined with the processor so that the processor reads information out of the storage medium and record information in the storage medium. Alternatively, the storage medium may be integrated with the processor. The processor and storage medium may reside in an ASIC.

In one or more example embodiments, the above-described functions may be implemented in hardware, software, firmware, or any combination thereof. When implemented in software, the functions may be stored as one or more instructions or codes in a computer readable medium or transmitted through the same. The computer readable medium includes both a communication medium and computer storage medium including any medium facilitating to transfer a computer program from one place to another. The storage medium may be any available medium accessible by a general-purpose or special-purpose computer. As non-limiting examples, such computer readable medium may include a RAM, ROM, EEPROM, CD-ROM or other optical disc storage, magnetic disk storage or other magnetic storage devices, or any other medium available for transferring or storing program code means in a desired form of instructions or data structures and accessible by a general-purpose or special-purpose computer or special-purpose processor. For example, when the software is transmitted from a website, server, or other remote source using a coaxial cable, optical fiber cable, twisted pair, digital subscriber line (DSL), or infrared (IR) rays, or wireless techniques using wireless and microwaves, the coaxial cable, optical fiber cable, twisted pair, DSL, IR rays, and wireless techniques using wireless and microwaves belong to the definition of the computer readable medium. As used herein, the term "disk" or "disc" encompasses compact disc (CD), laser disc, optical disc, digital versatile disc (DVD), floppy disk, and Blu-ray disc, and here, the disk reproduces data generally magnetically while the disc reproduces data optically using laser beams. Combinations of those described above should be included in the computer readable medium.

Although some example embodiments of the present disclosure have been described with reference to the accompanying drawings, it will be appreciated by one of ordinary skill in the art that the present disclosure may be implemented in other various specific forms without changing the essence or technical spirit of the present disclosure. Thus, it should be noted that the above-described example embodiments are provided as examples and should not be interpreted as limiting.

What is claimed is:

1. A measurement method by a user equipment (UE), comprising:
   receiving a first measurement list from a base station, the first measurement list including one or more measurement candidates;
   entering an idle mode;
   measuring, at a first discontinuous reception (DRX) cycle, signal quality of at least some of the one or more measurement candidates independent of corresponding one or more first measurement periods, the one or more first measurement periods being periods determined for the at least some of the one or more measurement candidates;
   determining whether the measuring signal quality at the first DRX cycle after entering the idle mode is incomplete; and
   resuming the measuring signal quality at a subsequent DRX cycle in response to the measuring signal quality at the first DRX cycle after entering the idle mode being incomplete.

2. The measurement method of claim 1, wherein the measuring signal quality includes measuring the signal quality of the at least some of the one or more measurement candidates independent of the corresponding one or more first measurement periods even when a quality of a signal from the base station is higher than a threshold for stopping measurement.

3. The measurement method of claim 1, further comprising:
   receiving a second measurement list in the idle mode, the second measurement list being different from the first measurement list; and
   measuring signal quality of at least some of one or more measurement candidates in the second measurement list independent of corresponding one or more second measurement periods, the one or more second measurement periods being periods determined for the at least some of the one or more measurement candidates in the second measurement list, at a DRX cycle during which the second measurement list is received.

4. The measurement method of claim 1, further comprising:
   camping on a second base station in the idle mode, the camping on including receiving a third measurement list; and
   measuring a signal quality of at least some of one or more measurement candidates in the third measurement list independent of corresponding one or more third measurement periods, the one or more third measurement periods determined for the at least some of the one or more measurement candidates in the third measurement list, at a DRX cycle immediately after camping on the second base station.

5. The measurement method of claim 1, further comprising:

detecting a quality of a signal from the base station in the idle mode,
wherein the measuring signal quality includes measuring the signal quality at a DRX cycle during which the quality of the signal from the base station is detected to be less than a threshold.

6. The measurement method of claim 1, wherein the measuring signal quality includes measuring at least one of a reference signal received power (RSRP) or a reference signal received quality (RSRQ).

7. A user equipment (UE), comprising:
a transceiver; and
a processor coupled with the transceiver, the processor configured to,
receive a first measurement list from a base station, the first measurement list including one or more measurement candidates,
enter an idle mode,
measure, at a first discontinuous reception (DRX) cycle, signal quality of at least some of the one or more measurement candidate independent of corresponding one or more first measurement periods, the one or more first measurement periods being periods determined for the at least some of the one or more measurement candidates, and
determine whether the measuring signal quality at the first DRX cycle after entering the idle mode is incomplete; and
resume the measuring signal quality at a subsequent DRX cycle in response to the measuring signal quality at the first DRX cycle after entering the idle mode being incomplete.

8. The UE of claim 7, wherein the processor is further configured to measure the signal quality even when a quality of a signal from the base station is higher than a threshold for stopping measurement.

9. The UE of claim 7, wherein the processor is further configured to,
receive a second measurement list in the idle mode, the second measurement list being different from the first measurement list, and
measure signal quality of at least some of one or more measurement candidates in the second measurement list independent of corresponding one or more second measurement periods, the one or more second measurement periods being periods determined for the at least some of the one or more measurement candidates in the second measurement list, at a DRX cycle during which the second measurement list is received.

10. The UE of claim 7, wherein the processor is further configured to,
camp on a second base station in the idle mode, the camping on including receiving a third measurement list, and
measure signal quality of at least some of one or more measurement candidates in the third measurement list independent of corresponding one or more third measurement periods, the one or more third measurement periods being periods determined for the at least some of the one or more measurement candidates in the third measurement list, at a DRX cycle immediately after camping on the second base station.

11. The UE of claim 7, wherein the processor is further configured to,
detect a quality of a signal from the base station in the idle mode, and
measure the signal quality at a DRX cycle during which the quality of the signal from the base station is detected to be less than a threshold.

12. The UE of claim 7, wherein the processor is configured to measure the signal quality by measuring at least one of a reference signal received power (RSRP) or a reference signal received quality (RSRQ).

13. A chip for wireless communication, comprising:
a transceiver; and
a processor coupled with the transceiver, the processor configured to,
receive a measurement list from a base station, the measurement list including one or more measurement candidates,
enter an idle mode,
measure, at a first discontinuous reception (DRX) cycle, signal quality of at least some of the one or more measurement candidates independent of corresponding one or more measurement periods, the one or more measurement periods being periods determined for the at least some of the one or more measurement candidates,
determine whether the measuring signal quality at the first DRX cycle after entering the idle mode is incomplete; and
resume the measuring signal quality at a subsequent DRX cycle in response to the measuring signal quality at the first DRX cycle after entering the idle mode being incomplete.

14. The chip of claim 13, wherein the processor is further configured to,
measure the signal quality at a first discontinuous reception (DRX) cycle after entering an idle mode.

15. The chip of claim 14, wherein the processor is configured to measure the signal quality even when a quality of a signal from the base station is higher than a threshold for stopping measurement.

16. The chip of claim 13, wherein the processor is configured to measure the signal quality by measuring at least one of a reference signal received power (RSRP) or a reference signal received quality (RSRQ).

17. The measurement method of claim 1, further comprising:
measuring signal quality of at least some of the one or more measurement candidates according to the one or more first measurement periods in response to determining signal quality measurement has previously been performed for all of the one or more measurement candidates.

* * * * *